Dec. 28, 1937.  E. H. PERKINS ET AL  2,103,381
VEHICLE RUNNING GEAR
Filed May 17, 1935  4 Sheets-Sheet 1

INVENTORS
Edward H. Perkins
BY Hubert E. Mills
Thomas Griswold Jr. & E. C. Burdick
ATTORNEYS Dec. 28, 1937.  E. H. PERKINS ET AL  2,103,381
VEHICLE RUNNING GEAR
Filed May 17, 1935   4 Sheets-Sheet 2

INVENTORS
Edward H. Perkins
BY Hubert E. Mills
Thomas Griswold Jr. & E. C. Burdick
ATTORNEYS Dec. 28, 1937.   E. H. PERKINS ET AL   2,103,381
VEHICLE RUNNING GEAR
Filed May 17, 1935   4 Sheets-Sheet 3

INVENTORS
Edward H. Perkins
BY Hubert E. Mills
Thomas Griswold, Jr. & E. C. Burdick
ATTORNEYS Dec. 28, 1937.  E. H. PERKINS ET AL  2,103,381
VEHICLE RUNNING GEAR
Filed May 17, 1935    4 Sheets-Sheet 4

INVENTORS
Edward H. Perkins
Hubert E. Mills
BY
Thomas Griswold Jr. & E.C. Burdick
ATTORNEYS Patented Dec. 28, 1937

2,103,381

UNITED STATES PATENT OFFICE 2,103,381

VEHICLE RUNNING GEAR

Edward H. Perkins and Hubert E. Mills, Midland, Mich., assignors, by mesne assignments, to Whitehead & Kales Company, River Rouge, Mich., a corporation of Michigan Application May 17, 1935, Serial No. 21,940

2 Claims. (Cl. 280—124)

This invention relates to road vehicles, particularly to spring assemblies for tandem-wheel road vehicles; and, more particularly, to improvements in spring-suspension mechanisms for cushioning a vehicle body carried by a tandem-wheel and axle assembly.

The type of tandem-wheel assembly which we preferably use in connection with our present invention comprises two rocker beams, one on each side of the vehicle and parallel to the longitudinal axis of said vehicle. The rocker beams are journaled upon a transverse axle adjacent each end thereof, each rocker beam carrying two wheels, one at each end, mounted upon a short stub axle. Hence each wheel revolves upon its own stub axle, while the rocker beam carrying the wheels is free to oscillate upon the transverse axle. Since the position of each rocker beam is independent of the position of the other, the four wheels of the tandem-wheel assembly respond readily to uneven road surface, albeit said surface may afford four points of wheel contact in as many horizontal planes. Although the amount of vertical motion and shock and jar imparted to the body of the vehicle by passing over irregularities of the road surface is materially less with this type of wheel and axle assembly than with the more conventional types, there still remains a pronounced need for shock-absorbing means interposed between said assembly and said body.

Vehicles employing this type of tandem wheel assembly are characterized generally as having little road clearance, which places upon any cushioning means interposed between the load and the ground-engaging wheel assembly the requirement of permitting only a limited degree of vertical displacement between the axle and the body. When such vehicles are designed so as to increase the ratio of loaded weight to unloaded weight, the stresses to which the cushioning means are subjected in cushioning the unloaded vehicle, compared to those existing when the same vehicle is loaded, tend to become widely variant. Furthermore, because of the limited vertical displacement permissible and for other reasons, the cushioning means, to be most effective, must be placed as far as possible from the longitudinal center line of the vehicle, so as to counteract most effectively the over-turning moments produced in the vehicle when negotiating turns, etc.

When a wheel is carried by a rocker-beam, the axle about which the rocker-beam pivots is subjected to severe impact stresses whenever the wheel strikes an obstruction. These impact stresses tend to displace the rocker-beam axle relative to the body, which makes it necessary to employ means to restrict both lateral and longitudinal displacement of the axle relative to the body.

It is an object of the present invention to provide cushioning means between a load-carrying body and a tandem wheel and axle assembly which is effective over wide ranges of load conditions; i. e., between no load, partial load, and full load conditions.

Another object is to position cushioning members on opposite sides of the vehicle so as to provide the maximum spacing laterally between such members.

A further object is to provide means co-acting with the cushioning means to restrict lateral and longitudinal displacement of the load-carrying body with respect to the axle, and to maintain proper wheel alignment.

Other objects will appear from the following description.

Our improved cushioning means comprises two or more concentric helical springs of unequal uncompressed length, so proportioned with respect to diameter, cross-section, and number of convolutions as to provide springs of substantially the same length when fully compressed; i. e., compressed to the point where adjacent turns of the springs bear upon one another. These springs cooperate with suitable spring seats which retain the springs in proper relative position and which also transmit to the springs the forces of compression which are to be cushioned by said springs. By the use of such springs a compound compression-resisting action is obtained which produces effective cushioning action under widely varying loads.

Figure 1:
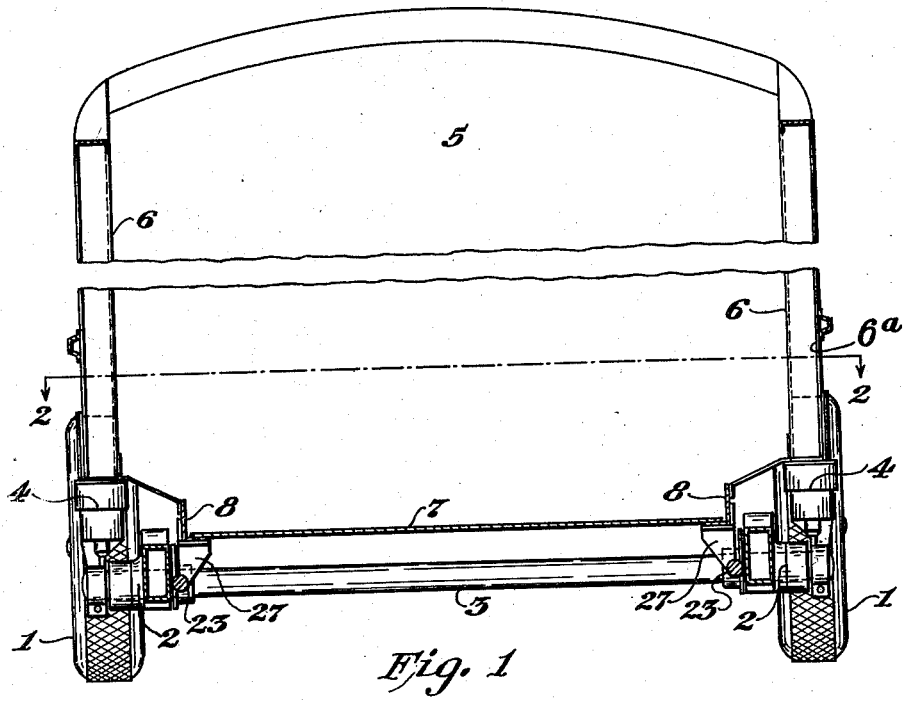
Fig. 1 is a vertical transverse section of a vehicle having an enclosed body and a tandem-wheel running gear, taken forward of a transverse axle supporting the running-gear, in which the body is cushioned upon the axle in accordance with the present invention.
Figure 2:
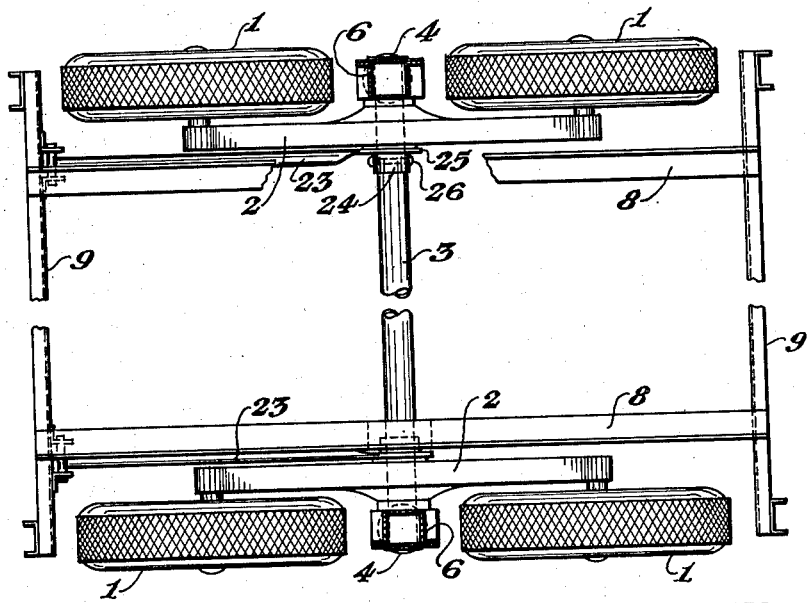
Fig. 2 is a horizontal sectional view taken on the line 2—2 of Fig. 1, with the floor removed.
Figure 3:
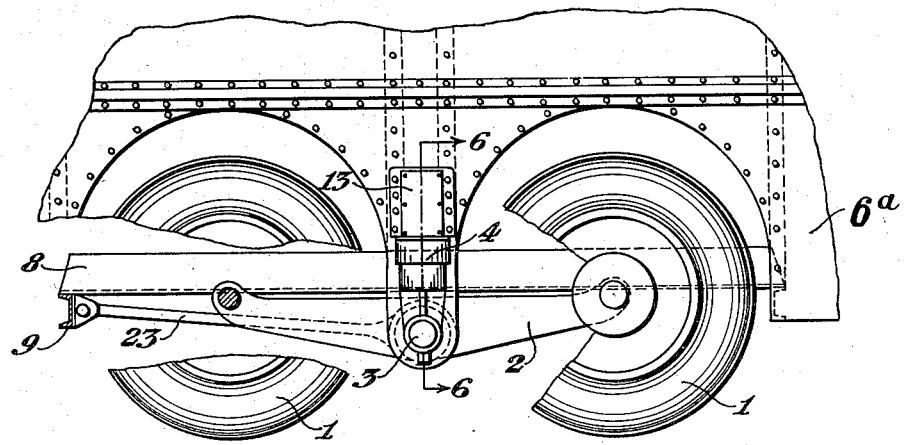
Fig. 3 is a partial side elevation of the vehicle with a portion of the wheels cut away.

Referring to the drawings, the relative placement and general design of the structure of the invention are shown in Figs. 1 and 2. Reference numerals 1 designate the ground-engaging wheels which are rotatably mounted upon spindles attached to the ends of rocker-beams 2, which in turn are journaled upon transverse axle 3 adjacent the ends thereof. At either end of axle 3 is mounted a cylindrical spring assembly 4 fixedly attached at its lower end to the axle and at its upper end to the body 5 of the vehicle. Spring assemblies 4 are shown in detail in Figs. 6 and 7, and a modified form in Fig. 8, hereinafter described. Body 5 is constructed with a skeleton framework including on either side a vertical post 6 having a U-section located directly above axle 3, posts 6 having the open side facing outwardly. Exteriorly said framework may be sheathed with metal plates 6a or equivalent covering material to form the sides of the body 5, the sheathing plates being cut away to form recesses within which wheels 1 are accommodated, as shown more particularly in Fig. 3. A floor 7 of body 5 is supported upon angles 8 which rest upon cross-members 9 under the body.

Figures 6, 7:
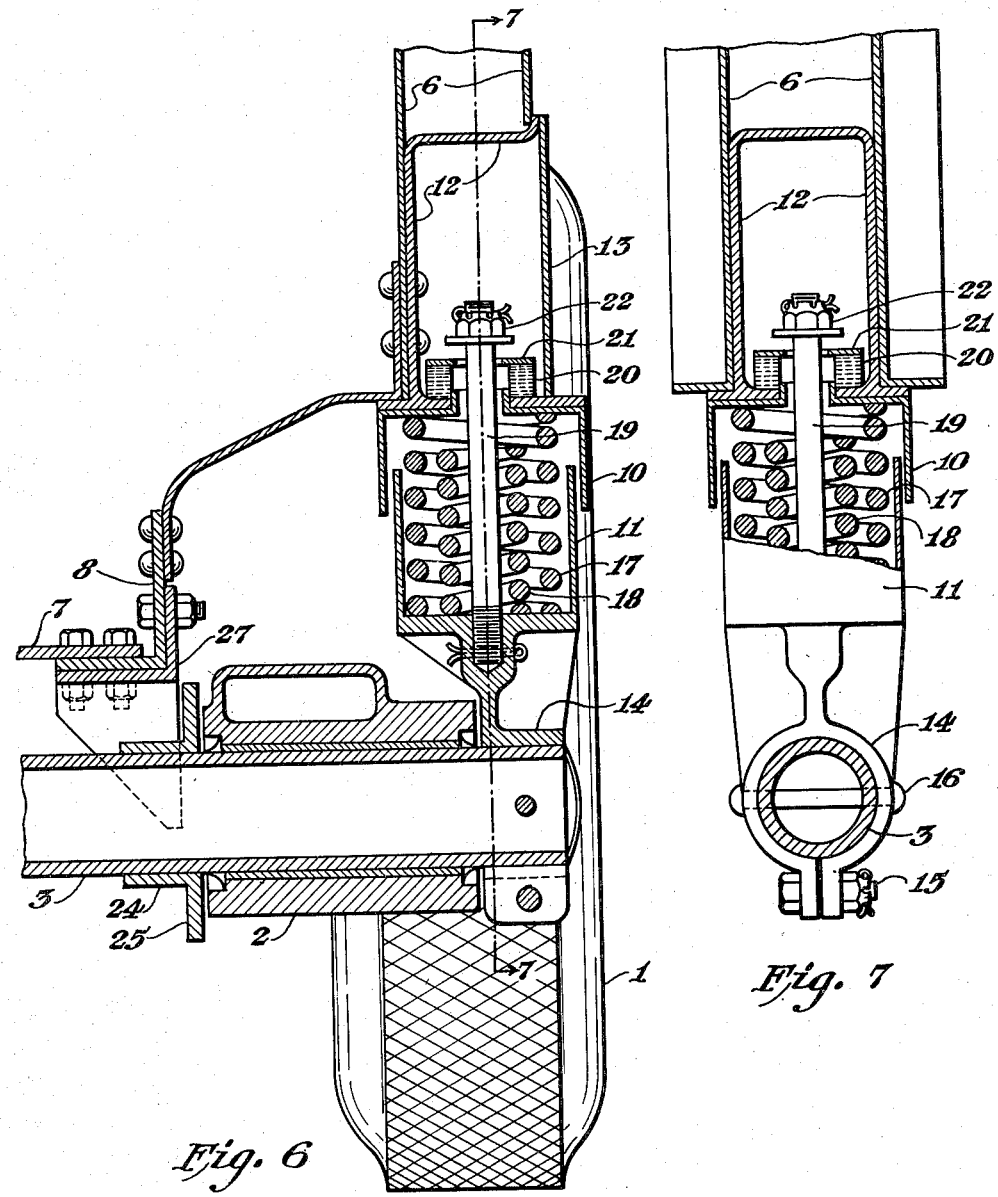
Fig. 6 is a central vertical section taken on line 6—6 of Fig. 3, drawn to a larger scale.
Fig. 7 is a central vertical section taken on line 7—7 of Fig. 6.
Figure 8:
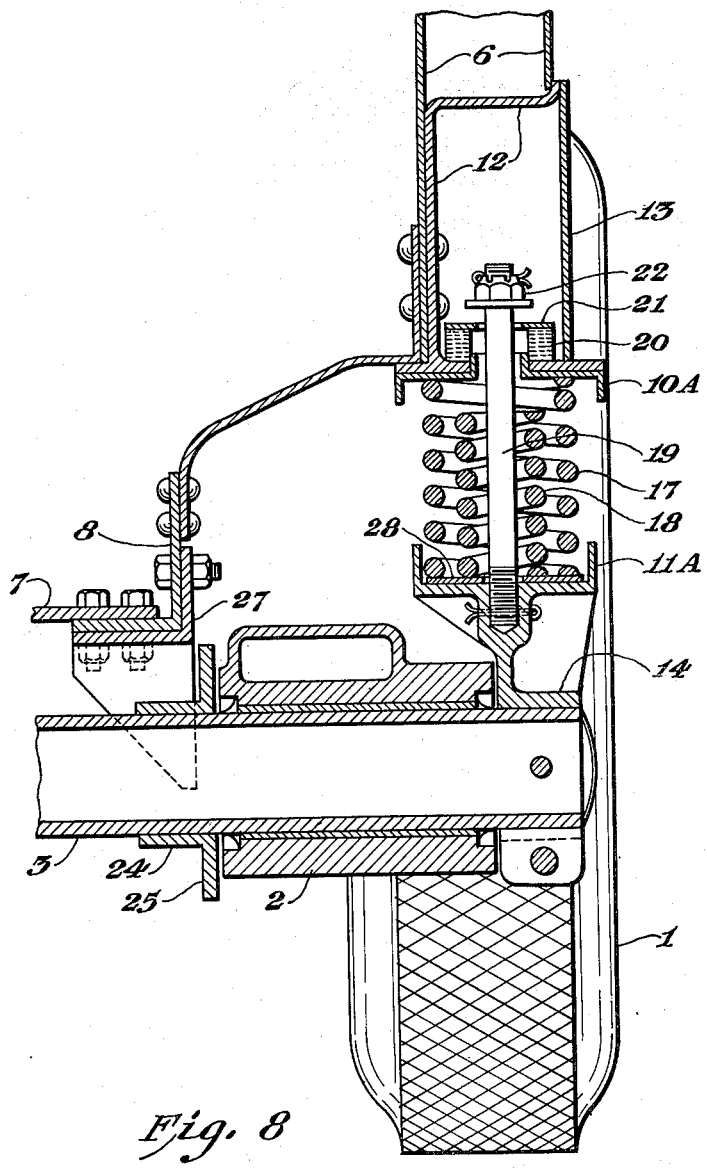
Fig. 8 is a central vertical section of a modified form of spring assembly, similar to the assembly shown in Figs. 6 and 7.

For details of spring assemblies 4, reference is made to Figs. 6, 7 and 8. Referring to Figs. 6 and 7, two telescoping cylindrical shells 10 and 11 act as upper and lower spring-seats. Upper spring-seat 10 is fixed to a rectangular box-like receptacle 12 which fits between the sides of post 6 at the lower end thereof and is firmly attached thereto, as by bolts or rivets. The outer side of receptacle 12 is open, to be covered by plate 13. The lower spring-seat 11 has an arm extending downwardly and terminating in a split collar 14 which fits over axle 3. Collar 14 is fastened firmly on axle 3 by drawing up the nut and bolt 15, and is further locked in place by means of through pin 16.

Held between spring-seats 10 and 11 are two concentric helical springs 17 and 18, spring 17 being longer than spring 18 when unloaded, but of substantially equal length when fully compressed. Axial to springs 17 and 18 is buffer rod 19 which is screwed into a boss on the bottom of member 11. Upper spring-seat 10 fits over lower seat 11 in telescoping manner, and the two members together form a retainer and housing for springs 17 and 18. Upper seat 10 has an opening in the center corresponding with a like opening in the bottom of receptacle 12, through which projects the upper end of rod 19 extending into the space within receptacle 12. A compression or buffer ring 20 of rubber or other compressible material capped with a metal washer 21 is fitted around said opening, while the upper end of rod 19 is provided with a flanged nut 22.

When the vehicle is operated unloaded, spring 17 transmits the weight to the axle 3, the shorter spring 18 coming into play to cushion only the heavier shocks. When a full load is being transported the weight is borne and the road shocks are absorbed by both springs. The longer spring 17 serves an important function in assuming the load and reducing the velocities at which the load is re-applied to the shorter spring 18 when the impact from severe road shocks momentarily throws the load off the shorter spring. Further important advantages inhere in the use of a plurality of springs of differing unloaded lengths and/or differing mean diameters, in that such springs have dissimilar natural periods or frequencies of vibration, the shorter spring having the considerably higher period. Hence the inherent tendency of a single spring to produce a cumulative "galloping" in the vehicle is counteracted, because the different natural period of one spring serves to oppose and "iron out" the vertical oscillations of the other as soon as they begin. The arrangement described provides for a varying spring tension of the cushioning member which is graduated in proportion to the amount of the load, permitting a wider variation in load conditions than when a single spring is used, without loss of resiliency at any point within the range of the load that can be carried. To check the rebound due to sudden road shocks the cap nut 22 and rubber buffer 20 are provided. When using this telescoping type of spring enclosure, the springs are fully enclosed and sealed in so that they are protected against accumulation of water, dust, or mud in the spring-retainer housing.

In Fig. 8 is shown a modified form of spring assembly. In place of the telescoping spring-seats 10 and 11 previously referred to, Fig. 8 shows non-telescoping spring-seats 10A and 11A. These members are equivalent to the corresponding parts 10 and 11 except that they provide a shallow cup to hold the upper and lower ends of the springs, which springs in this case are exposed instead of enclosed. The inner spring 18 is attached by welding at its lower end to a disk 28, which fits in the base of member 11A. The outer spring 17 rests upon disk 28, which serves to hold the two springs in fixed position and prevent side slip of the inner spring. The cushioning action of this form of spring-assembly is the same as that shown in Figs. 6 and 7. However, the modified construction is more accessible and simplifies the substitution or replacement of springs.

Spring assemblies 4 are located substantially in alignment with the wheels, as hereinbefore described. This arrangement has the advantage of securing the widest spacing of the spring supports for the body 5 of the vehicle, and thereby reduces to a minimum over-turning moment reactions on the body and bending or shearing stresses on the axle.

Figure 4:
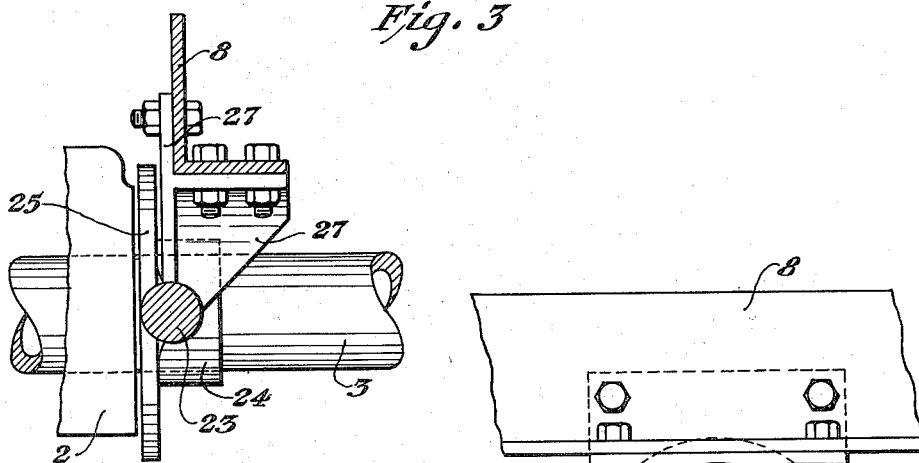
Figs. 4 and 5 are detail views of certain structural parts shown generally in Figs. 1–3.
Figure 5:
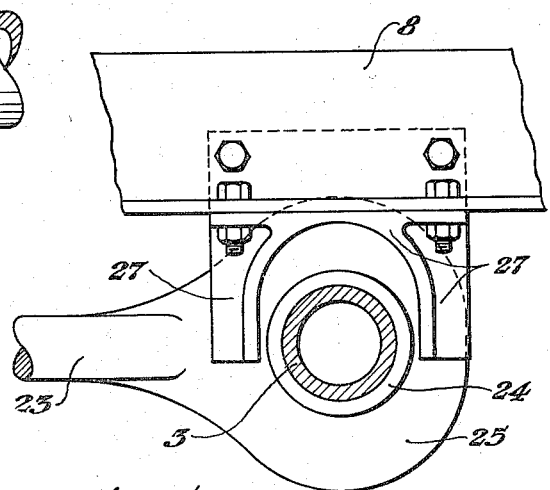

To insure proper wheel alignment and spring action and to avoid subjecting the spring assemblies to shearing or bending stresses, this invention also includes positive means for maintaining the running gear, consisting of the wheels, rocker-beams and transverse axle, in correct position relative to body 5. For this purpose the radius rods 23 are interposed between a body floor-member 9 and axle 3 to form a horizontal linkage therebetween. The radius rods 23 are hinged at one end to floor-supporting member 9, while the opposite ends terminate in flanged collar portions comprising collars 24 and flanges 25 engaging the axle 3, the axle being locked to one of the radius rod collars by pin 26, as shown in Fig. 2, while the collar on the opposite rod is journaled on the axle. Displacement of the body 5 relative to the axle 3 sidewise or laterally is prevented by bifurcated guide brackets 27 attached to angles 8 and depending therefrom, as shown generally in Figs. 1 and 2, and in detail in Figs. 4 and 5. Brackets 27 have a vertical bearing-face in which there is a U-shaped slot in which the axle may move vertically. This bifurcated bearing-face abuts against the contiguous face of the flange 25, while the opposite face of flange 25 bears against the adjacent journal-portion of rocker-beam 2. In this construction brackets 27 serve as guides for the vertical motion of the body 5 and inherently provide against the lateral movement of the body relative to the axle 3. Vertical body-motion results in sliding motion between the vertical faces of brackets 27 and flanges 25. Lateral motion of the body 5 relative to the running gear is prevented, since side thrust exerted by the body is carried by one or the other of brackets 27 into flange 25 contiguous thereto and this flange, acting as a thrust-washer, transmits the force to the adjacent rocker-beam. Thus the lateral component of centrifugal forces which develop in the body is transmitted to the road through brackets 27, flanges 25, rocker-beams 2 and wheels 1.

It is evident that various modifications of the structure herein described may be used without departing from the scope and principle of the invention. For example, three or more helical springs, instead of two, may be employed in the spring assembly, depending upon the range of load-carrying capacity to be accommodated in a particular case. Likewise, the transverse axle may, where convenient, be of the type known as a drop axle.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:—

1. A road vehicle having a body, a transversely extending axle beneath said body, rocker-beams on said axle adjacent opposite ends thereof, ground-engaging wheels upon the outer sides of said rocker-beams and connected thereto at opposite ends thereof, body supporting means at opposite ends of said axle upon the outer sides of said rocker-beams substantially in longitudinal alignment with said wheels, radius rods upon the inner sides of said rocker-beams and terminally connected to said body and axle, and guide brackets projecting downwardly from said body at each side thereof, each bracket having a slotted portion receiving the axle and an upright portion for sliding engagement with the contiguous radius rod.

2. A road vehicle having a body, a transversely extending axle beneath said body, rocker-beams on said axle adjacent opposite ends thereof, ground-engaging wheels upon the outer sides of said rocker-beams and connected thereto at opposite ends thereof, body supporting means at opposite ends of said axle upon the outer sides of said rocker-beams substantially in longitudinal alignment with said tandem wheels, guide brackets projecting downwardly from the body and straddling the axle upon the inner sides of the rocker-beams, and radius rods upon the inner sides of said rocker-beams and terminally connected to said body and axle, the connections between the rods and axle being between the rocker-beams and guide brackets.

EDWARD H. PERKINS.
HUBERT E. MILLS.